US011923575B2

(12) United States Patent
Kim et al.

(10) Patent No.: US 11,923,575 B2
(45) Date of Patent: Mar. 5, 2024

(54) FAULT DIAGNOSTIC APPARATUS FOR A FUEL CELL ELECTRIC VEHICLE AND A METHOD THEREFOR

(71) Applicants: HYUNDAI MOTOR COMPANY, Seoul (KR); KIA CORPORATION, Seoul (KR)

(72) Inventors: Min Taek Kim, Seoul (KR); Chang Hwan Ye, Hwaseong-si (KR); Soon Gil Kweon, Hwaseong-si (KR); Hyo Jin Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 378 days.

(21) Appl. No.: 17/470,699

(22) Filed: Sep. 9, 2021

(65) Prior Publication Data
US 2022/0181659 A1  Jun. 9, 2022

(30) Foreign Application Priority Data
Dec. 7, 2020 (KR) .................. 10-2020-0169807

(51) Int. Cl.
*G01R 31/327* (2006.01)
*B60L 50/70* (2019.01)
(Continued)

(52) U.S. Cl.
CPC ......... *H01M 8/04679* (2013.01); *B60L 50/70* (2019.02); *B60L 58/34* (2019.02);
(Continued)

(58) Field of Classification Search
CPC ......... H01M 8/04679; H01M 8/04228; H01M 8/04303; H01M 8/04559; H01M 8/0488;
(Continued)

(56) References Cited

U.S. PATENT DOCUMENTS 9,851,388 B2  12/2017 Kim et al.
2013/0257440 A1* 10/2013 Takahashi ............. H02J 7/0034
324/418

(Continued)

FOREIGN PATENT DOCUMENTS

JP  2008251448 A  10/2008
JP  2009301791 A  12/2009
(Continued)

*Primary Examiner* — Gonzalo Laguarda
(74) *Attorney, Agent, or Firm* — Lempia Summerfield Katz LLC (57) ABSTRACT

A fault diagnostic apparatus for a fuel cell electric vehicle and a method therefor are provided. The apparatus includes: a main relay connected to a fuel cell stack; a power converter connected to the main relay; a heater relay connected to the fuel cell stack and the main relay at one end and connected to a cathode oxygen depletion (COD) heater at the other end; and a fuel cell control unit (FCU) connected with the main relay, the power converter, and the heater relay. The FCU diagnoses a fault of the main relay based on an amount of change in stack voltage according to control to turn off and on the heater relay and a power of the power converter according to variable control of a voltage of the power converter, when the vehicle enters a shutdown sequence, and outputs the diagnosed result.

17 Claims, 3 Drawing Sheets

(51) Int. Cl.
 *B60L 58/34* (2019.01)
 *H01M 8/04228* (2016.01)
 *H01M 8/04303* (2016.01)
 *H01M 8/04537* (2016.01)
 *H01M 8/04664* (2016.01)
 *H01M 8/04858* (2016.01)

(52) U.S. Cl.
 CPC ... *H01M 8/04228* (2016.02); *H01M 8/04303* (2016.02); *H01M 8/04559* (2013.01); *H01M 8/0488* (2013.01); *B60L 2240/527* (2013.01); *H01M 2250/20* (2013.01)

(58) Field of Classification Search
 CPC .... H01M 2250/20; B60L 50/70; B60L 58/34; B60L 2240/527; G01R 31/327
 See application file for complete search history.

(56) References Cited

U.S. PATENT DOCUMENTS

| | | | |
|---|---|---|---|
| 2015/0323603 A1* | 11/2015 | Kim | G01R 31/50 |
| | | | 702/58 |
| 2017/0136913 A1* | 5/2017 | Yang | B60L 58/20 |
| 2019/0288308 A1 | 9/2019 | Park et al. | |
| 2020/0180438 A1 | 6/2020 | Shin et al. | |

FOREIGN PATENT DOCUMENTS

| | | |
|---|---|---|
| KR | 101551088 B1 | 9/2015 |
| KR | 101566720 B1 | 11/2015 |
| KR | 101593761 B1 | 2/2016 |
| KR | 101673822 B1 | 11/2016 |
| KR | 20200072270 A | 6/2020 |
| KR | 20200075931 A | 6/2020 |

* cited by examiner

FAULT DIAGNOSTIC APPARATUS FOR A FUEL CELL ELECTRIC VEHICLE AND A METHOD THEREFOR

CROSS-REFERENCE TO RELATED APPLICATION

This application claims the benefit of priority to Korean Patent Application No. 10-2020-0169807, filed in the Korean Intellectual Property Office on Dec. 7, 2020, the entire contents of which are incorporated herein by reference.

TECHNICAL FIELD

The present disclosure relates to a fault diagnostic apparatus for a fuel cell electric vehicle and a method therefor.

BACKGROUND

As there has been an increase in interest in reducing environmental pollution, research has been actively conducted in environment-friendly energy sources. Among them, a fuel cell system, which uses a fuel cell developed by the electrochemical reaction between hydrogen and oxygen, has been in the spotlight. A fuel cell electric vehicle loaded with such a fuel cell system drives an electric motor using power produced by the fuel cell.

It is impossible for a stack main relay applied to the fuel cell electric vehicle to perform internal diagnosis when a fusion fault occurs. Thus, an existing technology diagnoses a fusion fault of the stack main relay using a separate function of detecting the fusion fault of the stack main relay. However, because phenomena due to the fusion fault of the stack main relay and an operation delay fault of a cathode oxygen depletion (COD) heater are the same as each other, the fusion fault of the stack main relay is incorrectly diagnosed as the fault of the COD heater. When the fusion fault of the stack main relay is incorrectly diagnosed as the fault of the COD heater, it is impossible to identify accurate fault cause and there is a probability that a maintenance error will occur. Furthermore, as it is impossible to operate the COD heater although the heater relay is turned on upon the fusion fault of the stack main relay, because it is impossible to compulsorily exhaust voltage remaining in the stack, durability of the stack may be degraded and a time taken for the vehicle to be turned off becomes longer.

SUMMARY

The present disclosure has been made to solve the above-mentioned problems occurring in the prior art while advantages achieved by the prior art are maintained intact.

An aspect of the present disclosure provides a fault diagnostic apparatus for a fuel cell electric vehicle for detecting that a fusion fault of a main relay of a stack of a fuel cell electric vehicle occurs and diagnosing the fault and a method therefor.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a fault diagnostic apparatus for a fuel cell electric vehicle may include a main relay connected to a fuel cell stack. The apparatus may also include a power converter connected to the main relay and a heater relay connected to the fuel cell stack and the main relay at one end and connected to a cathode oxygen depletion (COD) heater at the other end. The apparatus may also include a fuel cell control unit (FCU) connected with the main relay, the power converter, and the heater relay. The FCU may diagnose a fault of the main relay based on an amount of change in stack voltage according to control to turn off and on the heater relay and a power of the power converter according to variable control of a voltage of the power converter, when the vehicle enters a shutdown sequence, and may output the diagnosed result.

The FCU may monitor a stack voltage during a predetermined time from a time when the heater relay is turned on, when the vehicle enters the shutdown sequence, to determine whether exhaustion of the stack voltage is delayed.

The FCU may detect a first stack voltage after turning off the heater relay, may detect a second stack voltage after turning on the heater relay, and may calculate the amount of change in stack voltage using the first stack voltage and the second stack voltage.

The FCU may primarily determine the fault of the main relay when the amount of change in stack voltage is less than a reference amount of change.

The FCU may determine an operation delay fault of the COD heater when the amount of change in stack voltage is not less than the reference amount of change.

The FCU may variably control an output voltage of the power converter to an upper limit voltage and a lower limit voltage.

The FCU may detect a first power converter power when the output voltage of the power converter is variably controlled to the upper limit voltage. The FCU may also detect a second power converter power when the output voltage of the power converter is variably controlled to the lower limit voltage. The FCU may also secondarily determine the fault of the main relay depending on whether the first power converter power and the second power converter power meet a main relay fault diagnosis condition.

The FCU may determine a main relay fusion fault when the first power converter power is less than a first reference power and when the second power converter power is greater than the first reference power and is less than a second reference power.

The FCU may determine an operation delay fault of the COD heater when the first power converter power is greater than or equal to the first reference power and when the second power converter power is less than or equal to the first reference power and is greater than or equal to the second reference power.

The power converter may be implemented as a bidirectional high voltage DC-DC converter (BHDC).

According to another aspect of the present disclosure, a fault diagnostic method for a fuel cell electric vehicle including a fuel cell control unit (FCU) connected with a main relay of a fuel cell stack, a power converter, and a heater relay may include detecting whether the vehicle enters a shutdown sequence. The method may also include diagnosing a fault of the main relay based on an amount of change in stack voltage according to control to turn off and on the heater relay and a power of the power converter according to variable control of a voltage of the power converter, when the vehicle enters the shutdown sequence. The method may also include outputting the result of diagnosing the fault of the main relay.

The diagnosing of the fault of the main relay may include monitoring a stack voltage during a predetermined time from a time when the heater relay is turned on and determining whether exhaustion of the stack voltage is delayed based on the result of monitoring the stack voltage.

The diagnosing of the fault of the main relay may include detecting a static voltage when the heater relay is turned off and on and calculating the amount of change in stack voltage. The diagnosing may also include determining whether the amount of change in stack voltage is less than a reference amount of change. The diagnosing may also include primarily determining the fault of the main relay when the amount of change in stack voltage is less than the reference amount of change.

The diagnosing of the fault of the main relay may include determining an operation delay fault of a COD heater when the amount of change in stack voltage is not less than the reference amount of change.

The diagnosing of the fault of the main relay may include variably controlling an output voltage of the power converter to an upper limit voltage to detect a first power converter power. The diagnosing may also include variably controlling the output voltage of the power converter to a lower limit voltage to detect a second power converter power. The diagnosing may also include secondarily determining the fault of the main relay when the first power converter power and the second power converter power meet a main relay fault diagnosis condition.

The secondarily determining may include determining a main relay fusion fault when the first power converter power is less than a first reference power and when the second power converter power is greater than the first reference power and is less than a second reference power.

The diagnosing of the fault of the main relay may further include determining an operation delay fault of a COD heater when the first power converter power and the second power converter power do not meet the main relay fault diagnosis condition.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

Figure 1:
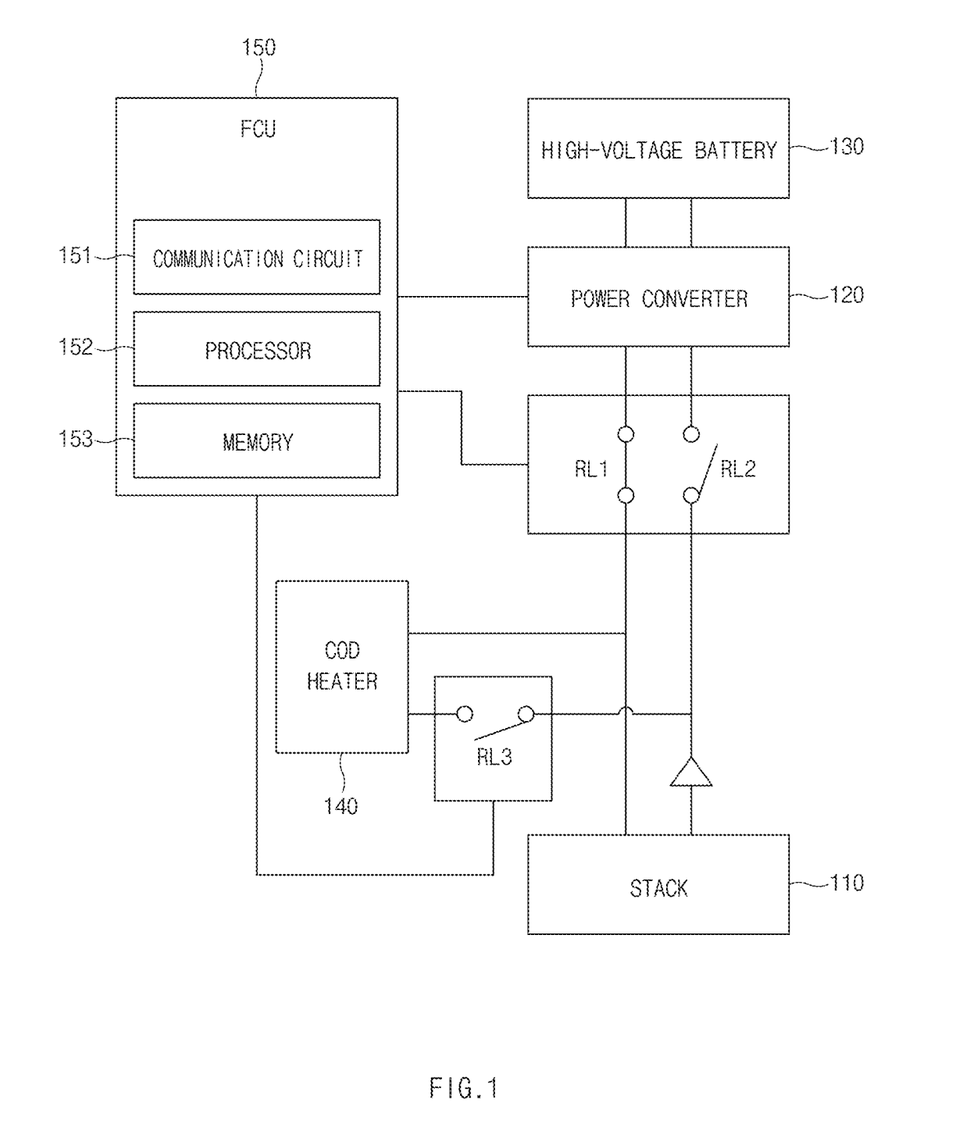
FIG. 1 is a block diagram illustrating a configuration of a fault diagnostic apparatus for a fuel cell electric vehicle according to embodiments of the present disclosure.

FIG. 1 is a block diagram illustrating a configuration of a fault diagnostic apparatus for a fuel cell electric vehicle according to embodiments of the present disclosure.

Referring to FIG. 1, the fault diagnostic apparatus for the fuel cell electric vehicle may include a fuel cell stack (hereinafter referred to as "stack") 110, a power converter 120, a high-voltage battery 130, a cathode oxygen depletion (COD) heater 140, a fuel cell control unit (FCU) 150, a first main relay RL1, a second main relay RL2, and a heater relay RL3.

The stack 110 may produce electrical energy by an electrochemical reaction between hydrogen provided from a hydrogen tank (not shown) and oxygen collected from the external air. The stack 110 may include two catalyst electrodes, in other words, an anode and a cathode. When hydrogen and oxygen are respectively provided to the anode and the cathode, the anode may divide the hydrogen into protons, i.e., hydrogen ions and electrons. The hydrogen ions may move to the cathode through an electrolyte layer and may be combined with oxygen in the cathode to produce water. Electrons pass through an external circuit to generate current. In other words, electrical energy may be produced due to a potential difference between the anode and the cathode. The electrical energy generated by the stack 110 may be used as driving energy of a motor (not shown).

The power converter 120 may convert power output from the high-voltage battery 130 or power input to the high-voltage battery 130. For example, the power converter 120 may convert voltage output from the high-voltage battery 130 into voltage required to drive the motor to output the converted voltage. Furthermore, the power converter 120 may convert voltage output from the stack 110 into a charging voltage required to charge the high-voltage battery 130. Such a power converter 120 may be implemented as a bidirectional high voltage DC-DC converter (BHDC).

The power converter 120 may vary an output voltage under an instruction of the FCU 150. The power converter 120 may adjust the output voltage to an upper limit voltage or a lower limit voltage. Herein, the upper limit voltage and the lower limit voltage may be preset to a maximum operating voltage and a minimum operating voltage of the power converter 120.

The first main relay RL1 and the second main relay RL2 may be arranged between the stack 110 and the power converter 120. The first main relay RL1 and the second main relay RL2 may be collectively referred to as a stack main relay. The first main relay RL1 may be connected to a minus (−) terminal of the stack 110 and the second main relay RL2 may be connected to a plus (+) terminal of the stack 110. In the specification, the first main relay RL1 and the second main relay RL2 may be interchangeably used with a minus (−) main relay and a plus (+) main relay, respectively.

The high-voltage battery 130 may store (charge) electrical energy produced by the stack 110 or may emit (discharge) the stored electrical energy. The high-voltage battery 130 may receive power converted by the power converter 120 or may transfer the stored power to the power converter 120.

The COD heater 140 may play a role in compulsorily exhausting voltage remaining in the stack 110 using an internal resistance load when a fuel cell is turned on (starts) and is turned off (stops or shuts down) to improve durability of the stack 110. In other words, the COD heater 140 may remove oxygen and hydrogen remaining in the stack 110 when the vehicle starts and is shut down to prevent degradation of the stack 110.

The COD heater 140 may be connected to the first main relay RL1 and the minus (−) terminal of the stack 110 and may be connected to one end of the heater relay RL3. The other end of the heater relay RL3 may be connected to the plus (+) terminal of the stack 110 and the second main relay RL2. The heater relay RL3 may be turned on or off under an instruction of the FCU 150.

The FCU 150 may be connected to the power converter 120, the first main relay RL1, the second main relay RL2, and the heater relay RL3 using an inter-vehicle communication network. The inter-vehicle communication network may be implemented as a controller area network (CAN), a media oriented systems transport (MOST) network, a local interconnect network (LIN), an Ethernet, an X-by-Wire (Flexray), and/or the like.

The FCU 150 may control to turn on and/or off the first main relay RL1 and/or the second main relay RL2 and may control the power converter 120 to drive a drive motor (not shown) through power transfer and power conversion between the stack 110 and the high-voltage battery 130.

The FCU 150 may turn on the main relays RL1 and RL2 to operate a high voltage system. Furthermore, the FCU 150 may turn off the second main relay RL2 and may turn on the heater relay RL3, in a condition (e.g., starting/stopping of the fuel cell and the other driving conditions) which needs an operation of the COD heater 140 to control such that voltage remaining in the stack 110 is exhausted through the COD heater 140.

When exhaustion of the stack voltage is delayed while the fuel cell electric vehicle is turned off, the FCU 150 may diagnose a main relay fusion fault. Upon the fusion fault of the second main relay RL2, because it is impossible to operate a function of the COD heater 140 irrespective of control to turn on the heater relay RL3 and because current is continuously supplied from the high-voltage battery 130, exhaustion of the voltage may be delayed. The FCU 150 may transmit a command for each driving situation to control to turn on and/or off the main relays RL1 and RL2 and the heater relay RL3 and control a voltage of the power converter 120 and may perform power transfer and conversion.

The FCU 150 may include a communication circuit 151, a processor 152, and a memory 153. The communication circuit 151 may transmit (send out) a control signal to at least one of the power converter 120, the first main relay RL1, the second main relay RL2, and the heater relay RL3 using an inter-vehicle communication network. Furthermore, the communication circuit 151 may receive a state signal (e.g., an ON signal or an OFF signal) or the like transmitted from at least one of the power converter 120, the first main relay RL1, the second main relay RL2, and the heater relay RL3.

The processor 152 may perform the overall control of the FCU 150. The processor 152 may be implemented as at least one of an application specific integrated circuit (ASIC), a digital signal processor (DSP), programmable logic devices (PLD), field programmable gate arrays (FPGAs), a central processing unit (CPU), microcontrollers, or microprocessors. The memory 153 may be a non-transitory storage medium, which stores instructions executed by the processor 152. The memory 153 may store data generated according to an operation of the processor 152 and may store a variety of setting information. The memory 153 may be implemented as at least one of storage media (recording media) such as a flash memory, a hard disk, a random access memory (RAM), a static RAM (SRAM), a read only memory (ROM), a programmable ROM (PROM), an electrically erasable and programmable ROM (EEPROM), an erasable and programmable ROM (EPROM), and a register.

The processor 152 may determine whether the vehicle enters a shutdown sequence. The processor 152 may receive information (a signal) providing a notification that the vehicle enters the shutdown sequence from an upper-level controller (e.g., a vehicle control unit (VCU) or the like), a sensor, or the like via the communication circuit 151.

When the vehicle enters the shutdown sequence, the processor 152 may turn on the heater relay RL3 to operate the COD heater 140. In this case, the COD heater 140 may exhaust voltage remaining in the stack 110. The processor 152 may monitor an output voltage (i.e., a stack voltage) of the stack 110 during a predetermined time T from a time when the heater relay RL3 is turned on. In this case, the processor 152 may monitor the stack voltage using a voltage sensor, a voltage meter, or the like.

The processor 152 may determine whether the stack voltage is greater than a reference voltage during a predetermined time. When the static voltage is greater than the reference voltage during the predetermined time, the processor 152 may determine that there is a probability that a stack main relay will fail. When the static voltage decreases to the reference voltage or less during the predetermined time, the processor 152 may determine that the stack main relay (or the main relay) is normal.

When the static voltage is greater than the reference voltage during the predetermined time, the processor 152 may perform primary fault diagnosis for determining whether the main relay fails. The processor 152 may monitor an amount of change in stack voltage by means of control to turn off and on the heater relay RL3 to primarily determine whether the main relay fails. The processor 152 may change the heater relay RL3 from an ON state to an OFF state to detect a first stack voltage and may change the heater relay RL3 from the OFF state to the ON state to detect a second stack voltage. The processor 152 may calculate the amount of voltage in stack voltage using the first stack voltage and the second stack voltage. The processor 152 may determine whether the amount of change in static voltage is less than a reference amount of change to primarily determine that the main relay fails or that the COD heater 140 fails. Herein, the reference amount of change may be preset based on experimental values. When the amount of change in static voltage is greater than or equal to the reference amount of change, the processor 152 may determine the COD heater 140 fails.

When the amount of change in static voltage is less than the reference amount of change, the processor 152 may perform secondary fault diagnosis. The processor 152 may variably control an output voltage (a power converter voltage) of the power converter 120 to monitor an output power (a power converter power) of the power converter 120. The processor 152 may control the power converter 120 to output an upper limit voltage. At this time, the processor 152 may detect a first power converter power using a power sensor or the like. Furthermore, the processor 152 may control the power converter 120 to output a lower limit voltage and may detect a second power converter power when the power convert voltage is the lower limit voltage. The processor 152 may determine whether the power converter power meets a main relay fault diagnosis condition to secondarily determine that the main relay fails or that the COD heater 140 fails. When the power converter power meets the main relay fault diagnosis condition, the processor 152 may determine (fix) a main relay fusion fault. When the power converter power does not meet the main relay fault diagnosis condition, the processor 152 may determine that the COD heater 140 fails. In other words, when the first power converter power is less than a first reference power and when the second power converter power is greater than the first reference power and is less than a second reference power, the processor 152 may determine a fusion fault of the second main relay RL2. Meanwhile, when the first power converter power is greater than or equal to the first reference power or when the second power converter power is less than or equal to the first reference power and is greater than or equal to the second reference power, the processor 152 may determine an operation delay fault of the COD heater 140.

When the fault diagnosis is completed, the processor 152 may store a diagnostic code indicating the diagnosed fault in the memory 153 and may output the diagnostic code on an output device (e.g., a display, a cluster, and/or the like). When the plus (+) main relay fusion fault is fixed (determined), the processor 152 may store a diagnostic code corresponding to the fault in the memory 153 and may display the diagnostic code on the display. When it is determined that the COD heater 140 fails, the processor 152 may store a diagnostic code indicating that the COD heater 140 fails in the memory 153 and may turn on a warning light indicating an operation delay fault of the COD heater 140 on the cluster.

Figure 2:
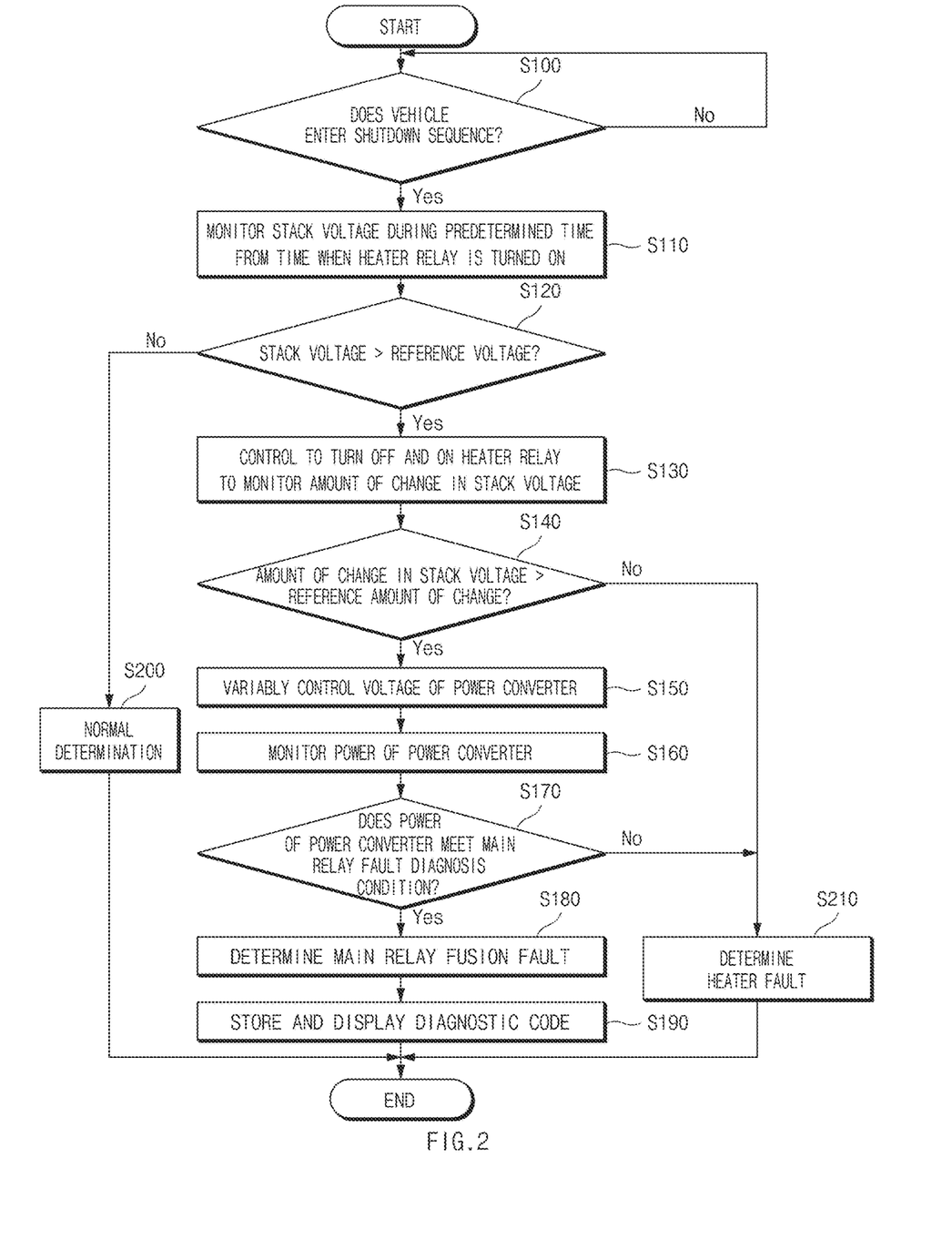
FIG. 2 is a flowchart illustrating a fault diagnostic method for a fuel cell electric vehicle according to embodiments of the present disclosure.

FIG. 2 is a flowchart illustrating a fault diagnostic method for a fuel cell electric vehicle according to embodiments of the present disclosure.

Referring to FIG. 2, in S100, an FCU 150 of FIG. 1 may determine whether the vehicle enters a shutdown sequence. When a stack 110 of FIG. 1 starts to be shut down, the FCU 150 may turn off a second main relay RL2 of FIG. 1 and may turn on a heater relay RL3 of FIG. 1 to operate a COD heater 140 of FIG. 1. The COD heater 140 may exhaust voltage remaining in the stack 110.

When the vehicle enters the shutdown sequence, in S110, the FCU 150 may monitor an output voltage (hereinafter referred to as "stack voltage") of the stack 110 during a predetermined time T1 from a time when the heater relay RL3 is turned on. The FCU 150 may monitor the stack voltage using a voltage sensor or the like.

In S120, the FCU 150 may determine whether the stack voltage is greater than a reference voltage. When the static voltage is greater than the reference voltage during a predetermined time, the FCU 150 may determine that the stack voltage is not normally exhausted. In other words, when the static voltage is greater than the reference voltage during the predetermined time, the FCU 150 may determine that exhaustion of the stack voltage is delayed.

When the stack voltage is greater than the reference voltage, in S130, the FCU 150 may control to turn off and on (off/on) the heater relay RL3 to monitor an amount of change in stack voltage. The FCU 150 may turn off the heater relay RL3 and may then turn on the heater relay RL3. The FCU 150 may detect a stack voltage (a first stack voltage) when the heater relay RL3 is turned off using a voltage meter, a voltage sensor, or the like and may detect a stack voltage (a second stack voltage) when the heater relay RL3 is turned on. The FCU 150 may calculate the amount of voltage in stack voltage using the first stack voltage and the second stack voltage.

In S140, the FCU 150 may determine whether the amount of change in stack voltage is less than a reference amount of change. Because it is impossible to operate the COD heater 140 due to a main relay fusion fault when the amount of change in stack voltage is less than the reference amount of change, the FCU 150 may primarily determine that the main relay fails.

When the amount of change in stack voltage is less than the reference amount of change, in S150, the FCU 150 may variably control an output voltage of a power converter 120 of FIG. 1. When it is primarily determined that the main relay fails, the FCU 150 may control the power converter 120 to output an upper limit voltage and a lower limit voltage. When the output voltage of the power converter 120 decreases to the lower limit voltage, because the stack voltages decreases, the FCU 150 may shorten a time taken to exhaust voltage remaining the stack 110 although a main relay fusion fault occurs.

In S160, the FCU 150 may monitor an output power of the power converter 120 according to the variable control of the voltage of the power converter 120. The FCU 150 may detect a first power converter power when the power converter voltage is the upper limit voltage and may detect a second power converter power when the power converter voltage is the lower limit voltage.

In S170, the FCU 150 may determine whether the power of the power converter 120 meets a main relay fault diagnosis condition. The FCU 150 may determine whether the first power converter power is less than a first reference power and whether the second power converter power is greater than the first reference power and is less than a second reference power.

When the power of the power converter 120 meets the main relay fault diagnosis condition, in S180, the FCU 150 may determine a main relay fusion fault. When the first power converter power is less than the first reference power and when the second power converter power is greater than the first reference power and is less than the second reference power, the FCU 150 may determine a fusion fault of the plus (+) main relay RL2.

When the main relay fusion fault is determined, in S190, the FCU 150 may store and display a diagnostic code corresponding to the determined result. The FCU 150 may store the diagnostic code in a memory 153 of FIG. 1 and may output the diagnostic code on a display device such as a display or a cluster.

When the static voltage is not greater than the reference voltage in S120, in S200, the FCU 150 may determine that the main relays RL1 and RL2 are normal. When the stack voltage decreases to the reference voltage or less as the stack voltage is normally exhausted during a predetermined time, the FCU 150 may determine that the main relays RL1 and RL2 are normal. In other words, when the exhaustion of the stack voltage is not delayed, the FCU 150 may determine that the main relays RL1 and RL2 are normal.

When the amount of change in stack voltage is not less than the reference amount of change in S140 or when the power of the power converter 120 does not meet the main relay fault diagnosis condition in S170, in S210, the FCU 150 may fix the heater fault (heater operation delay fault). When the stack voltage is exhausted by a normal operation of the COD heater 140, because the amount of change in stack voltage is very greater than the reference amount of change, the FCU 150 may determine the heater operation delay fault when the amount of change in stack voltage is greater than or equal to the reference amount of change. When the first power converter power is greater than or equal to the first reference power or when the second power converter power is less than the first reference power and is greater than or equal to the second reference power, the FCU 150 may determine the heater operation delay fault. When the heater operation delay fault is determined, the FCU 150 may output a warning indicating the fault through an output device (e.g., a display, a speaker, and/or the like).

Figure 3:
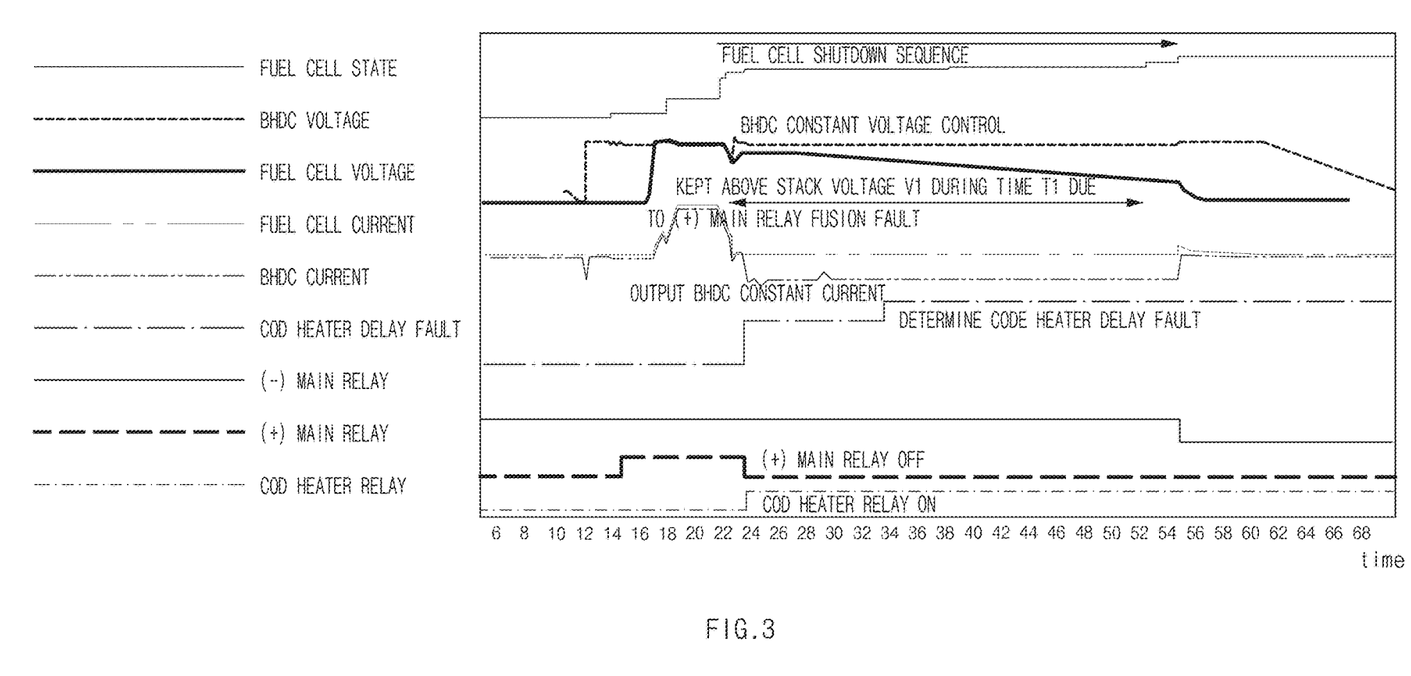
FIG. 3 is a drawing illustrating a fault diagnosis effect of a fuel cell electric vehicle according to embodiments of the present disclosure.

FIG. 3 is a drawing illustrating a fault diagnosis effect of a fuel cell electric vehicle according to embodiments of the present disclosure.

Referring to FIG. 3, when a fusion fault of a plus (+) main relay RL2 of the stack 110 of FIG. 1 occurs, the plus (+) main relay RL2 may be turned off and a heater relay RL3 of FIG. 1 may be turned on. However, because a COD heater 140 of FIG. 1 is not operated, a stack voltage may be kept greater than a reference voltage V1 during a certain time T1 without being normally exhausted.

When an FCU 150 of FIG. 1 performs constant voltage control of a power converter 120 of FIG. 1, because an output current of the power converter 120 is output as a constant current, a power converter power may be output as a fixed value. At this time, the power converter power may be lower than a first reference power.

Based on such a result, the fault diagnostic apparatus for the fuel cell electric vehicle may monitor the amount of change in stack voltage according to control to turn off/on the heater relay RL3 and a power converter power according to the variable control of the voltage of the power converter. Thus, a stack main relay fusion fault may be accurately detected.

According to embodiments of the present disclosure, the fault diagnostic apparatus may detect a fusion fault of the main relay connected to a plus (+) terminal of the fuel cell stack. Thus, durability of the stack from being degraded may be prevented by means of a suitable fail-safe operation.

Furthermore, according to embodiments of the present disclosure, the fault diagnostic apparatus may diagnose a fusion fault of the plus (+) main relay. Thus, a maintenance error as a COD heater relay fault being incorrectly diagnosed may be prevented and a driving situation which continues a fusion fault state of the plus (+) main relay may be prevented.

Furthermore, according to embodiments of the present disclosure, the fault diagnostic apparatus may shorten a time taken to exhaust voltage remaining in the stack by controlling the voltage of the power converter, although the COD heater is not operated, when the vehicle starts or is shut down due to a fusion fault of the plus (+) main relay. Furthermore, the fault diagnostic apparatus may prevent durability of the stack from being degraded because the COD heater is not operated. Thus, maintenance costs according to replacement of a fuel cell may be saved.

Hereinabove, although the present disclosure has been described with reference to embodiments and the accompanying drawings, the present disclosure is not limited thereto.

The embodiments may be variously modified and altered by those having ordinary skill in the art to which the present disclosure pertains without departing from the spirit and scope of the present disclosure claimed in the following claims. Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims and all the technical ideas within the scope equivalent to the claims should be included in the scope of the present disclosure.

What is claimed is:

1. A fault diagnostic apparatus for a fuel cell electric vehicle, the fault diagnostic apparatus comprising:
a main relay connected to a fuel cell stack;
a power converter connected to the main relay;
a heater relay connected to the fuel cell stack and the main relay at one end and connected to a cathode oxygen depletion (COD) heater at the other end; and
a fuel cell control unit (FCU) connected with the main relay, the power converter, and the heater relay,
wherein the FCU diagnoses a fault of the main relay based on an amount of change in stack voltage according to control to turn off and on the heater relay and a power of the power converter according to variable control of a voltage of the power converter, when the vehicle enters a shutdown sequence, and outputs the diagnosed result.

2. The fault diagnostic apparatus of claim 1, wherein the FCU monitors a stack voltage during a predetermined time from a time when the heater relay is turned on, when the vehicle enters the shutdown sequence, to determine whether exhaustion of the stack voltage is delayed.

3. The fault diagnostic apparatus of claim 1, wherein the FCU detects a first stack voltage after turning off the heater relay, detects a second stack voltage after turning on the heater relay, and calculates the amount of change in stack voltage using the first stack voltage and the second stack voltage.

4. The fault diagnostic apparatus of claim 3, wherein the FCU primarily determines the fault of the main relay when the amount of change in stack voltage is less than a reference amount of change.

5. The fault diagnostic apparatus of claim 4, wherein the FCU determines an operation delay fault of the COD heater when the amount of change in stack voltage is not less than the reference amount of change.

6. The fault diagnostic apparatus of claim 1, wherein the FCU variably controls an output voltage of the power converter to an upper limit voltage and a lower limit voltage.

7. The fault diagnostic apparatus of claim 6, wherein the FCU detects a first power converter power, when the output voltage of the power converter is variably controlled to the upper limit voltage, detects a second power converter power, when the output voltage of the power converter is variably controlled to the lower limit voltage, and secondarily determines the fault of the main relay depending on whether the first power converter power and the second power converter power meet a main relay fault diagnosis condition.

8. The fault diagnostic apparatus of claim 7, wherein the FCU determines a main relay fusion fault when the first power converter power is less than a first reference power and when the second power converter power is greater than the first reference power and is less than a second reference power.

9. The fault diagnostic apparatus of claim 8, wherein the FCU determines an operation delay fault of the COD heater when the first power converter power is greater than or equal to the first reference power and when the second power converter power is less than or equal to the first reference power and is greater than or equal to the second reference power.

10. The fault diagnostic apparatus of claim 1, wherein the power converter is implemented as a bidirectional high voltage DC-DC converter (BHDC).

11. A fault diagnostic method for a fuel cell electric vehicle including a fuel cell control unit (FCU) connected with a main relay of a fuel cell stack, a power converter, and a heater relay, the fault diagnostic method comprising:
- detecting whether the vehicle enters a shutdown sequence;
- diagnosing a fault of the main relay based on an amount of change in stack voltage according to control to turn off and on the heater relay and a power of the power converter according to variable control of a voltage of the power converter when the vehicle enters the shutdown sequence; and
- outputting the result of diagnosing the fault of the main relay.

12. The fault diagnostic method of claim 11, wherein the diagnosing of the fault of the main relay includes:
- monitoring a stack voltage during a predetermined time from a time when the heater relay is turned on; and
- determining whether exhaustion of the stack voltage is delayed based on the result of monitoring the stack voltage.

13. The fault diagnostic method of claim 11, wherein the diagnosing of the fault of the main relay includes:
- detecting a static voltage when the heater relay is turned off and on and calculating the amount of change in stack voltage;
- determining whether the amount of change in stack voltage is less than a reference amount of change; and
- primarily determining the fault of the main relay when the amount of change in stack voltage is less than the reference amount of change.

14. The fault diagnostic method of claim 13, wherein the diagnosing of the fault of the main relay includes:
- determining an operation delay fault of a COD heater when the amount of change in stack voltage is not less than the reference amount of change.

15. The fault diagnostic method of claim 11, wherein the diagnosing of the fault of the main relay includes:
- variably controlling an output voltage of the power converter to an upper limit voltage to detect a first power converter power;
- variably controlling the output voltage of the power converter to a lower limit voltage to detect a second power converter power; and
- secondarily determining the fault of the main relay when the first power converter power and the second power converter power meet a main relay fault diagnosis condition.

16. The fault diagnostic method of claim 15, wherein the secondarily determining includes:
- determining a main relay fusion fault when the first power converter power is less than a first reference power and when the second power converter power is greater than the first reference power and is less than a second reference power.

17. The fault diagnostic method of claim 15, wherein the diagnosing of the fault of the main relay further includes:
- determining an operation delay fault of a COD heater when the first power converter power and the second power converter power do not meet the main relay fault diagnosis condition.

* * * * *